US008769511B2

(12) United States Patent
Gal et al.

(10) Patent No.: US 8,769,511 B2
(45) Date of Patent: Jul. 1, 2014

(54) DYNAMIC INCREMENTAL COMPILER AND METHOD

(75) Inventors: Andreas Imre Gal, Irvine, CA (US); Michael Franz, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 818 days.

(21) Appl. No.: 11/676,198

(22) Filed: Feb. 16, 2007

(65) Prior Publication Data
US 2007/0226700 A1 Sep. 27, 2007

Related U.S. Application Data

(60) Provisional application No. 60/774,946, filed on Feb. 16, 2006.

(51) Int. Cl.
*G06F 9/45* (2006.01)
(52) U.S. Cl.
USPC ............ 717/148; 717/151; 717/153; 717/158
(58) Field of Classification Search
USPC .................................................. 717/157, 148
See application file for complete search history.

(56) References Cited

U.S. PATENT DOCUMENTS

| 4,558,413 | A  | * | 12/1985 | Schmidt et al. ............... 707/203 |
| 5,768,595 | A  | * | 6/1998  | Gillies ........................... 717/145 |
| 5,884,083 | A  | * | 3/1999  | Royce et al. ................... 717/143 |
| 5,946,474 | A  | * | 8/1999  | Skogby ............................ 703/13 |
| 6,170,083 | B1 | * | 1/2001  | Adl-Tabatabai .............. 717/158 |
| 6,351,844 | B1 | * | 2/2002  | Bala ................................ 717/128 |
| 6,427,234 | B1 | * | 7/2002  | Chambers et al. ............ 717/140 |
| 6,457,172 | B1 | * | 9/2002  | Carmichael et al. .......... 717/141 |
| 6,470,492 | B2 |   | 10/2002 | Bala et al. |
| 6,687,896 | B1 | * | 2/2004  | Royce et al. ................... 717/141 |
| 6,738,967 | B1 | * | 5/2004  | Radigan ........................ 717/146 |
| 6,996,814 | B2 | * | 2/2006  | Bak ............................... 717/148 |
| 7,080,366 | B2 | * | 7/2006  | Kramskoy et al. ............. 717/148 |
| 7,185,327 | B2 | * | 2/2007  | Scales ............................ 717/155 |
| 7,278,137 | B1 | * | 10/2007 | Fuhler et al. .................. 717/153 |
| 7,725,885 | B1 | * | 5/2010  | Pradhan et al. ............... 717/148 |
| 2002/0162096 | A1 | * | 10/2002 | Robison ........................ 717/145 |
| 2004/0205409 | A1 | * | 10/2004 | Wu et al. ......................... 714/38 |
| 2005/0044538 | A1 | * | 2/2005  | Mantripragada ............. 717/151 |
| 2007/0240132 | A1 | * | 10/2007 | Wolfe ............................ 717/140 |

OTHER PUBLICATIONS

Generating Java Trace Data, Steven P Reiss et al, ACM, Jun. 2000, 7 pages.*
J: A Tool for Dynamic Analysis of Java Programs, Bruno Dufour et al, ACM, Oct. 2003, 2 pages.*

(Continued)

*Primary Examiner* — Jue Louie
(74) *Attorney, Agent, or Firm* — Klein, O'Neill & Singh, LLP

(57) ABSTRACT

A virtual machine executive (VME) system operating on a target platform that includes a virtual machine monitor (VMM) and a dynamic compiler, in particular, a trace compiler (TC). System embodiments include a virtual machine monitor configured to record a trace corresponding to a selected cycle, and configured to transform the trace into a representation of a trace tree; and a trace compiler cooperating with the virtual machine monitor to compile the representation of the trace tree into a compiled code segment of native machine code executable on the target platform, in which the trace is a linear instruction sequence traversing at least a portion of a method, a loop, or a branching node.

11 Claims, 8 Drawing Sheets

(56) References Cited

OTHER PUBLICATIONS

JIVE: Visualizationg Java in Action, Steven P. Reiss, ACM, 2003, 2 pages.*

Compilers Principles, Techniques and Tools, Aho et al, Chapters 1-5, Sep. 12, 1985.*

Mössenböck, "Adding Static Single Assignment Form and a Graph Coloring Register Allocator to the Java Hotspot Client Computer", 2000, Technical Report, Institute for Practical Computer Science, Johannes Kepler University.*

Alpern et al. "The Jalapeno virtual machine", 2000, IBM System Journal, vol. 39, No. 1.*

Bala et al. "Dynamo: A Transparent Dynamic Optimization System", 2000, PLDI 2000.*

Bruening et al. "Exploring Optimal Compilation Unit Shapes for an Embedded Just-In-Time Compiler", 2000, Third ACM Workshop on Feedback-Directed Optimization FDDO-3.*

Whaley, "Partial Method Compilation using Dynamic Profile Information", 2001, OOPSLA 2001.*

Suganuma et al. "A Region-Based Compilation Technique for a Java Just-In-Time Compiler", 2003, PLDI 2003.*

Kumar, "When and What to Compile/Optimize in a Virtual Machine?", 2004, ACM SIGPLAN Notices, vol. 39(3).*

Cierniak et al. "Practicing JUDO: Java Under Dynamic Optimizations", 2000, ACM SIGPLAN Notices, vol. 35, Issue 5, pp. 13-26.*

Ung et al. "Optimising Hot Paths in a Dynamic Binary Translator", Mar. 2001, ACM SIGARCH Computer Architecture News, vol. 29, Issue 1, pp. 55-65.*

Definition of "invoke", Merriam-Webster Dictionary, retrieved from: http://www.merriam-webster.com/dictionary/invoke, on Jul. 1, 2013.*

"CLDC HotSpt™ Implementation Virtual Machine", Java™ 2 Platform, Micro Edition (J2ME™) Technology, Feb. 2005.

* cited by examiner

DYNAMIC INCREMENTAL COMPILER AND METHOD

CROSS-REFERENCE TO RELATED APPLICATIONS

This application hereby claims priority under 35 U.S.C. §119 to U.S. Provisional Patent Application No. 60/774,946, filed on Feb. 16, 2006 entitled "TRACE DRIVEN JUST-IN-TIME COMPILATION WITH STATIC SINGLE ASSIGNMENT FORM," by inventors Michael Franz and Andreas Gal, which hereby is incorporated by reference herein, in its entirety.

STATEMENT REGARDING FEDERALLY SPONSORED RESEARCH OR DEVELOPMENT

The present disclosure was developed with funding provided under National Science Foundation Contract No. CNS-0205712. The federal government may have rights in this invention.

TECHNICAL FIELD

The present disclosure relates generally to programming techniques and, more particularly, to just-in-time compilers and related methods of compilation.

BACKGROUND

Typically, cross-platform software is compiled into an intermediate code, which may be translated into native machine code and subsequently executed, by a platform-specific execution engine, or virtual machine (VM). However convenient, the intermediate step of instruction-by-instruction interpretation into native code may impose substantial performance penalties, relative to purely native code execution. For example, many languages employ a stack-based VM that generates and stores a frame upon each method invocation to preserve its pre-invocation state. A frame may include an operand stack, an array of local variables, and a reference to a related pool of constants. After each method completes, the VM recoups the respective state data, and releases the frame. Thus, a sequence that invokes multiple methods, nested methods, or loops having complex method sequences, may result in significant performance-draining overhead. An unconstrained resource platform may have sufficient processor speed, memory, available power, or other platform resources, so that program execution by exclusive interpretation produces little perceptible performance degradation. However, in a constrained resource platform, exclusive interpretation may impose an unacceptably high cost, high power consumption, and reduced performance.

In an effort to reduce interpretation, a VM may include a just-in-time (JIT), or dynamic, compiler that translates particular sequences into native machine code, on-the-fly, prior to, or during, direct execution by the underlying physical CPU. Nevertheless, dynamic compilation techniques may impose significant costs during execution of an application. For example, where an instruction sequence invokes multiple methods, each method may be compiled in its entirety. As a result, dynamic compilation may result in a delay, or latency, which may extend from the beginning of compilation until the onset of the underlying system response to the executed code. This latency can be significant when compiling complex sequences, and may be undesirable for time-sensitive applications. In another example, dynamic dispatching is a costly runtime technique used to determine a particular method code invocation sequence, which may not be known at compile time. As a result, current dynamic compilers can do little to ameliorate overhead which may be associated with dynamic dispatching. Also, compiled method code may be stored in a code cache for future execution, potentially reducing future latency. Over time, a dynamic compiler may compile and store even rarely-used methods encountered during VM operation, which may represent a suboptimal use of platform resources.

On an unconstrained platform, many current dynamic compilation techniques may produce optimized native code transparently, despite consuming significant platform resources. However, the platform resources used to dynamically compile optimized native code may be far beyond those available in many embedded computers, for example, on an inexpensive mobile telephone using an embedded processor. In an attempt to strike a balance between resource consumption and compiled code performance, embedded dynamic compilers have evolved, using simple algorithms and heuristics, which may not yield sufficient code optimization and, ultimately, execution performance, particularly for sophisticated embedded applications. In view of the foregoing, there is a need for a dynamic compiler capable of producing optimized native code that may be suitable for use in a constrained-resource platform, including an embedded system.

SUMMARY

The present disclosure describes a virtual machine executive (VME) system operating on a target platform that includes a virtual machine monitor (VMM) and a dynamic compiler, in particular, a trace compiler (TC). System embodiments include a virtual machine monitor configured to record a trace corresponding to a selected cycle, and configured to transform the trace into a representation of a trace tree; and a trace compiler cooperating with the virtual machine monitor to compile the representation of the trace tree into a compiled code segment of native machine code executable on the target platform, in which the trace is a linear instruction sequence traversing at least a portion of a method, a loop, or a branching node.

Certain embodiments include a virtual code interpreter cooperating with the virtual machine monitor to record as the trace virtual machine code instructions corresponding to a selected cycle. The loop may have multiple internal paths. In selected system embodiments, the representation of the trace tree is implicit. Also, in certain system embodiments, the trace includes a primary trace and at least one secondary trace, ordered in a predetermined forward succession sequence. The trace compiler can transform the trace from a first computer code corresponding to first computer architecture to a second computer code corresponding to a second computer architecture.

Certain other apparatus embodiments provide a virtual processor for a constrained-resource target platform, including a trace compiler, configured to monitor execution of a virtual code instruction sequence on a virtual code interpreter, configured to record a portion of the instruction sequence including at least a portion of a method, and configured to dynamically compile the trace as an executable compiled code segment. The trace compiler can be a dynamic, incremental trace compiler.

Other selected method embodiments include a method for operating a constrained-resource target platform, including monitoring execution of selected instructions to identify a cycle therein; monitoring an execution frequency of the cycle; selecting the cycle as a primary trace in response to the execution frequency being equal to or greater than a predetermined cycle threshold frequency; recording execution of cycle instructions as recorded trace code; optimizing the recorded trace code in a trace tree static single assignment form (TTSSA) generating a representation of a TTSSA trace tree; and compiling the representation of the TTSSA trace tree into native machine code in reverse of a predetermined succession sequence. The cycle instructions can traverse at least a portion of a method. Also, successively selecting alternative cycle paths may be disposed as a succession of secondary traces arranged in the predetermined succession sequence.

Yet other selected method embodiments can provide for dynamic compilation, including transforming an executed virtual code representation into a trace code representation in trace tree static single assignment (TTSSA) form wherein trace code representation is arranged with a predetermined forward succession sequence; implicitly generating a TTSSA trace tree from the trace code representation; and transforming the trace code representation into native machine code by compiling the trace code representation in reverse of the predetermined forward succession sequence.

BRIEF DESCRIPTION OF DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1B:
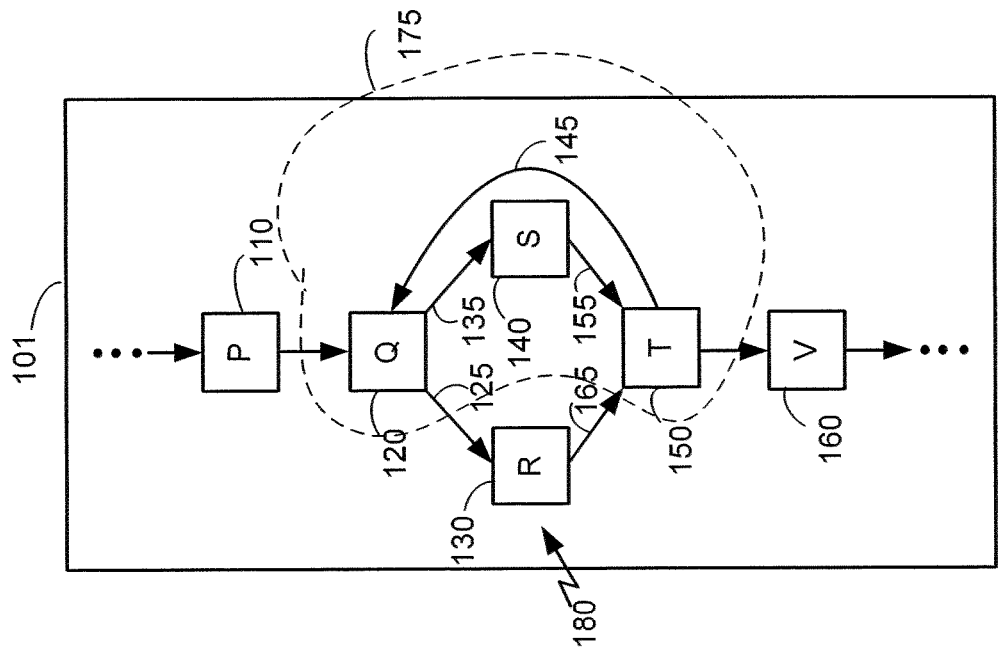
FIG. 1B is an illustration of a program flow diagram, corresponding to the illustration of FIG. 1.

The present disclosure describes embodiments of a virtual machine executive (VME) including a virtual machine monitor (VMM) and corresponding virtual machine monitor methods as well a trace compiler, and methods of trace compilation (collectively, a TC), which may be suitable for use in a constrained-resource system. The VME also may include a virtual code interpreter (VCI) configured to interpret (that is, to translate and execute) a virtual machine code (v-code). In general, constituents of the VME cooperate to execute an application program, in the form of v-code, presented to the VCI. The VMM may monitor the VCI operations, and may selectively record an executed linear sequence of v-code instructions, that is a primary trace, in response to a selected cyclic code structure, identified during monitoring. The VMM may analyze the recorded trace code, and may produce program description information.

In general, the trace code represents a forward temporal sequence of machine code execution, which begins at an anchor node and terminates at a primary backbranch node. Because a primary trace represents a cyclic structure, a primary backbranch node typically directs program flow control back to the anchor node. The program description information may be embedded in the v-code, which may facilitate optimization. Desirably, the VMM transforms the recorded trace v-code into a static single assignment form, namely, a trace tree static single assignment (TTSSA) form, which may be conducive to optimization. The VMM also may invoke the TC to generate native machine code from the v-code trace, may store the native code segment, and may cause a native code segment to later be executed in lieu of a corresponding portion of application program v-code. In addition, the VMM may monitor native code segment execution and may invoke the VCI upon the occurrence of a predetermined event, generally, a bailout. After a predetermined number of bailout occurrences fro a predetermined bailout condition, the VMM may record, analyze, and produce program description information for an auxiliary executed linear sequence of v-code instructions, that is, a secondary trace.

In general, a trace tree represents a set of alternate paths through a cycle, with all such paths sharing a common root. The first recorded trace can correspond to the primary trace, which forms the trace tree trunk beginning with the common root and extending to a trunk leaf. The terminal node corresponds to a primary trace backbranch node. More than one secondary trace may be recorded, with each secondary trace corresponding to an alternative path in the cycle, and with each secondary traces occurring in a succession sequence corresponding to the order of discovery/recording. A secondary trace generally begins with a guard node and terminates at a secondary backbranch node. A guard node can be embedded into recorded trace code at a point where the alternate path begins. A secondary backbranch node typically directs program flow control back to the primary trace anchor node. Each secondary trace may be represented in a trace tree as a secondary twig, with each twig having a crown, corresponding to a trace guard node, and an end leaf, corresponding to the secondary backbranch node. A terminal twig represents the secondary trace for which there is no successor, with a terminal crown representing the respective trace guard node and a terminal leaf representing the respective secondary backbranch node in the terminal twig. The VMM may transform primary and secondary traces into TTSSA form, and may construct a trace tree from the trunk and respective secondary twigs. In general, successive trace tree twigs can be ordered, from predecessor to successor, in a forward succession sequence.

Native code generation generally proceeds both in reverse of the forward succession sequence and in reverse of the forward temporal order. That is, native code generation is performed, twig by twig, in a reverse succession sequence, ordered from successor to predecessor. In each respective twig, native code generation typically proceeds in reverse temporal order, from end leaf to crown. Thus, relative to an entire trace tree, native code generation may begin with the trace tree terminal leaf and end with the trace tree root.

As used herein, a constrained-resource platform generally may be considered to be a device restricted in one or more platform resources, such as memory, computing capability, processor speed, or supplied power. By way of example, a constrained-resource platform may include, without limitation, a mobile or handheld system or device, such as a cellular telephone, a mobile wireless system, a smartcard device, a boundary scan device, a field programmable device, a personal digital assistant (PDA), or a pager, as well as another device or system having a small physical footprint or limited platform resources. In contrast, an unconstrained-resource platform may be workstation- or server-class computing system, as well as a typical desktop computer, or a device or system having platform resources considered to be ample for an intended performance level.

Figure 1A:
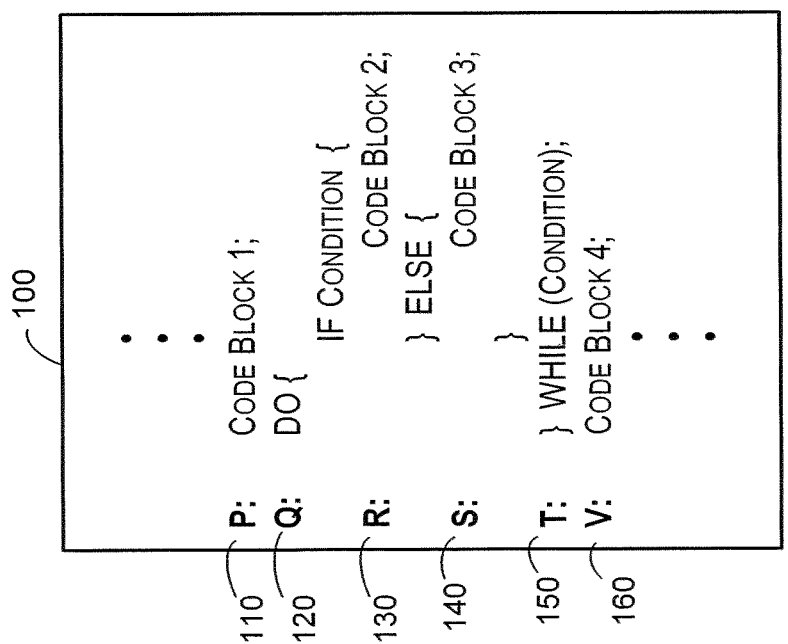
FIG. 1A is an illustration of a program code stub illustrating principles pertinent to the present disclosure.

FIGS. 1A and 1B illustrate pertinent program code principles and terms using example program code fragment 100 and corresponding flow graph 101. Typically, each node 110, 120, 130, 140, 150, 160 may represent a instruction, which may be a flow control node, e.g., node 120, 150, or an operational node, e.g., node 110, 130, 140, 160. A non-limiting example of an operational node can be a method, that is, an executable function, procedure, or subprogram, which can be invoked and which may pass a fixed number of values as arguments. Flow control node 120 can illustrate a conditional branch control node, as may be represented by an entry point into a DO-WHILE or IF-THEN-ELSE statement. Flow control node 150 can illustrate a backbranching control node (BBCN), such as a JUMP or GOTO statement, in which program flow control can be directed back to a corresponding backbranching target node (BBTN). A BBTN also can be termed a loop header, and may be a flow control node or an operational node. In general, a cycle, such as cycle 175, can be a cyclic node sequence, including a backbranching node, such as BBCN 150, a backbranching target node (BBTN) 120 referenced by BBCN 150, backbranch 145, and, potentially, at least one operational node e.g., node 140. A path generally describes a defined sequence of non-unique nodes that may be repeated multiple times over the span of the path.

Cycle 175 is illustrated in FIGS. 1A-1B as a simple loop, defined explicitly within a particular node sequence segment of a path. An operational node in a cycle, such as node 140 in cycle 175, may constitute one or more instructions including, without limitation, a method, a simple loop, a nested loop, a conditional branch, or a combination thereof. As a result, a cycle may appear complex from a logical programmatic view. However, a cycle path is not required to span the entirety of any constituent method, loop, or combination thereof, or include all branches corresponding to a constituent conditional branching instruction. Indeed, the path of a cycle can be determined empirically and may traverse all or a part of a constituent loop, a method, or both. Advantageously, methods in accordance with the present disclosure can transform a cycle, such as cycle 175, into a linear sequence of instructions, which begins with a loop header (e.g., a BBTN), and which terminates with a program flow control node (e.g., a BBCN) transferring program control flow to the corresponding BBTN.

During code execution, a node sequence in a path typically can be traversed in a forward temporal order. For example, in FIGS. 1A and 1B, one path may be defined between node 110, node 120, node 130, node 150, and node 160. Another path may be defined between node 110, node 120, node 140, node 150, and node 160. In FIGS. 1A-1B, a cycle path of cycle 175 may be defined to include flow control node 120, conditional branch path 135, operational node 140, branch path 155, BBCN node 150, and backbranch 145 extending between BBCN node 150 and BBTN node 120. Although cycle 175 exemplifies a non-sequential code path, a cycle path can be traversed in a forward temporal order during application program execution.

Many methods, loops, and branches may occur within the instruction path of an application program, although not every method, loop, or branch is accessed or traverse with similar frequency. It can be advantageous to compile a frequently-executed portion of an application program instruction path, such as cycle 175, without compiling operational nodes located outside of the cycle, such as nodes 110, 160. Conveniently, instructions sequences outside of a selected cycle path may remain uncompiled and may be executed by an interpreter. For example, a cycle path may include therewithin a conditional branch control node having two or more conditionally-executed branch paths. It may be beneficial to compile a predecessor branch path first encountered and to leave the untaken successor branch path uncompiled. Cycle 175 may represent a primary trace, including such a predecessor branch path. In accordance with embodiments described herein, a successor branch path may be dynamically compiled subsequently, if encountered. In FIGS. 1A-1B, a cycle path 180 can be an alternative path in cycle 175, which may be defined to include flow control node 120, conditional branch path 125, operational node 130, branch path 165, BBCN 150, and backbranch 145 extending between BBCN node 150 and BBTN node 120. Cycle path 180 may represent a secondary trace, including such a successor branch path.

Figure 2:
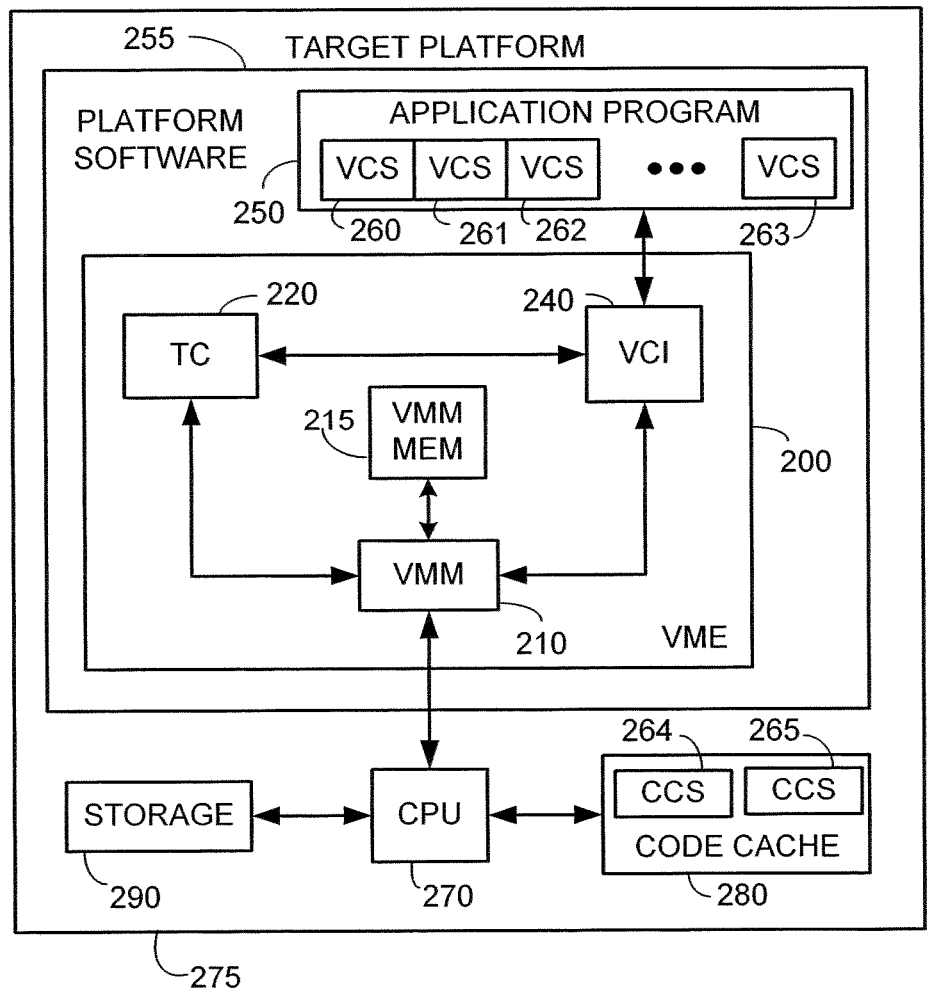
FIG. 2 is a graphical depiction of a target platform capable of operating selected disclosed embodiments.

Turning to FIG. 2, VMM 210, TC 220, and VCI 240 may be constituents of VME 200. VMM 210 can be a supervisory program that may monitor, control, and coordinates one or both of TC 220 or VCI 240. VMM 210 may "run" application program 250, for example, by cooperating with platform software 255 to execute native code on physical CPU 270 of target platform 275. VMM 210 can serve as a supervisory intermediary between platform software, and TC 220, VCI 240, or both, although one or both of TC 220 or VCI 240 may cooperate with platform software 255 directly. In an alternative embodiment of VME 200, VMM 210 may be absent, and TC 220 may be configured with supervisory functions to monitor, control, and coordinate with a VCI 240, and to run application program 250. In another alternative embodiment, TC 220 may be configured to operate apart from a code interpreter, such as VCI 240, for example, in a multi-compiler development system. VMM 210 may be coupled to a VMM memory area (VMM MEM) 215, which VMM 210 may use for code and data structure storage, scratch pad use, and other suitable purposes. VMM MEM 215 may be allocated dynamically to VMM 210, on an as-needed basis.

Application program 250 describes an instruction sequence that controls functions of CPU 270 and target platform 275. Application program 250 can be stored on target storage device 290 as a sequence of v-code instruction segments (VCS) 260-263. Typically, v-code instructions are read and translated by VCI 240 into native machine code, which subsequently is executed by CPU 270. Native machine code is a platform-specific machine code executable directly on physical CPU 270 of target platform 275. In addition, one or more compiled native machine code segments (CCS) 264-265, may correspond to one or more of VCS 260-263. CCS 264-265 may be compiled by TC 220, and may be stored in code cache 280. During execution of application program 250, VMM 210 may elect to cause one or more of CCS 264-265 to be executed in lieu of operation by VCI 240 upon the corresponding VCS 260-263.

It is desirable that embodiments of VMM 210 monitor execution of application program 250 by VCI 240; identify a v-code instruction sequences representing a frequently-occurring cycle; record the execution of the cycle v-code instruction sequence in a forward temporal order as a linear code trace; and to invoke TC 220 to transform the linear code trace into a corresponding one of CCS 264-265. Also, it may be desirable that VMM 210 analyze and transform the linear code trace into a trace tree static single assignment (TTSSA) form, by which TC 220 may produce optimized native machine code.

Advantageously, operation of VMM 210, as described herein, transforms seemingly complex procedural flows, data structures, and dynamic instantiations into a simplified, linearized code trace, which is transformed into a trace tree data structure implicitly incorporating the forward temporal order. Also, VMM 210 provides incremental expansion of a previously compiled cycle by transforming a subsequently encountered instruction path portion related to the cycle, into a simplified, linearized, and ordered code representation, which may be operatively joined to a previous trace tree data structure in a location corresponding to the point at which the instruction path is executed, relative to the cycle.

It is not required that TC 220 compile all or most of the v-code corresponding to application program 250, or that TC 220 subsequently re-compile substantially the same v-code. TC 220 can be a dynamic, incremental trace compiler, in which TC 220 may cooperate with VMM 210 to compile selected additional trace code "lazily," that is, as discovered. Over time, representations of the empirically discovered instruction path portions may be added to the trace tree data structure in a forward succession sequence corresponding to the order in which the instruction path portions are discovered. Moreover, operation of TC 220, as described herein, can generate optimized native code by traversing the trace tree data structure representation, in reverse of the forward succession sequence. Reverse sequence traversal can simplify optimizations, including dead code removal and register allocation, and can eliminate traditional dynamic compilation barriers, for example, dynamic dispatch for typed methods.

Figure 3:
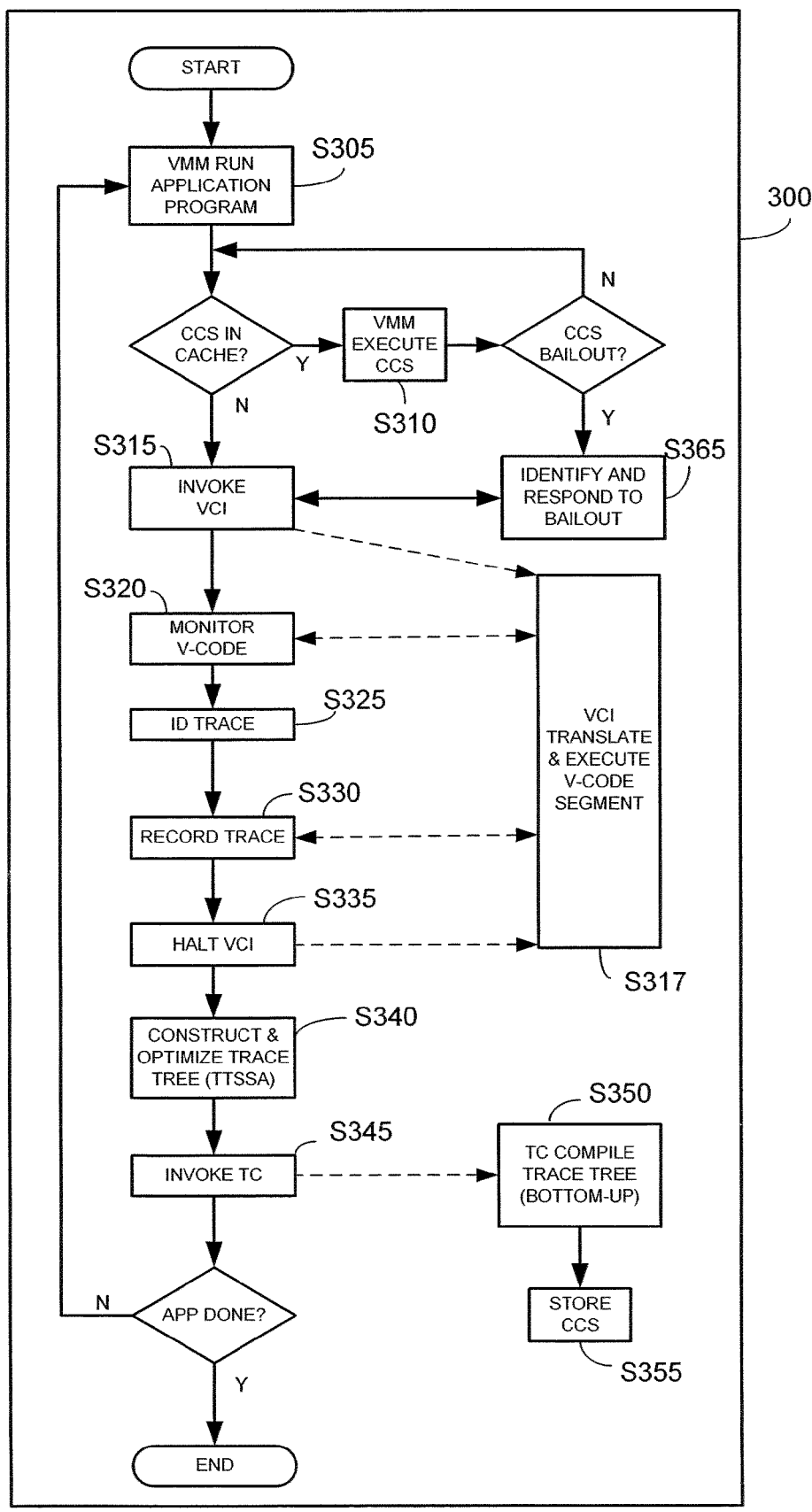
FIG. 3 is a flow diagram generally illustrating a method for dynamic compilation, in accordance with the present disclosure.

Referring now to FIG. 3, as well as to FIG. 2, one embodiment of dynamic incremental compilation method 300 can encompass include VMM 210 running (S305) application program 250. VMM 210 may execute (S310) a compiled code segment, such as CCS 264, 265, if available in code cache 280. Alternatively, VMM 210 may invoke (S315) VCI 240 to execute selected VCS 260-263. While VCI 240 is operating (S317), VMM 210 can monitor (S320) VCI 240 instruction execution, in general, and, in particular, may track executions of cycles. A frequently-executed cycle, occurring with at least a predetermined cycle threshold frequency, may be identified (S325) by VMM 210 as a trace. When a trace is so identified, VMM 210 may record (S330) the executed sequence of instructions corresponding to the cycle as a linear trace code sequence, beginning with the trace anchor node, during live execution by VCI 240. Recorded trace instructions extend from the anchor node generally in a forward temporal order, with the final node of a recorded trace being designated a terminal node. It may be beneficial to embed program description information into the recoded trace code.

Program description information may include program counter information, operand and data information, conditional branching information, method stack information, and other virtual machine state information. Conditional branching instructions may direct program flow control to two or more conditional branch paths, with only one conditional branch path being taken at a given moment of application program 250 execution. Conditional branching information may include branching information pertaining to a taken path, as well as to one or more untaken paths. An untaken path may correspond to a side exit, and corresponding program description information may be represented in compiled code produced by TC 220 to facilitate a graceful resumption of application program 250 by VCI 240 at a programmatic location corresponding to the respective side exit. Also, embedded conditional branching information may facilitate identifying and positioning sibling predecessor and successor conditional branch paths in a corresponding succession sequence.

Methods invoked during execution may contain method frame information, for example, an operand stack and an array of variables, and pointers to constants, which also may be included as embedded trace information. Runtime trace recording can transform a stack-based method call into a linear method instruction stream (hereinafter, "method inlining"), and it may be beneficial to embed related method stack information, corresponding to a respective recorded method call, into recorded trace code. Embedded method stack information may allow VCI 240 to reconstitute a stack corresponding to the respective method call, and to resume running application program 250 at or near the bailout point. In addition, embedded method stack information also may be used to characterize and track bailout occurrences during later execution of compiled code segments. Thus, while method inlining embodiments herein may substantially reduce stack-related overhead in a compiled code segment, embedded method stack information may bring an additional benefit of facilitating the transfer of application program 250 execution to VCI 240, even if compiled code segment termination may be premature.

Upon execution of the trace terminal node, VMM 210 may terminate trace code recording, and may halt (S335) VCI 240. VMM 210 may analyze recorded trace code and construct (S340) a trace tree structure in a trace tree static single assignment (TTSSA) form, which may facilitate the generation of optimized code by TC 220. If provided, embedded program description information also may be used to transform the trace tree structure into TTSSA form. Typically, a trace tree data structure corresponding to a primary trace can be represented as a primary trunk, having a root corresponding to the primary trace anchor node, and a trunk leaf corresponding to the trace terminal node. As one or more subsequent secondary traces are discovered, each trace can be transformed into a secondary twig in TTSSA form, and can be joined with the primary trunk, or to a predecessor secondary twig, at a location corresponding to the execution point of the secondary trace code in application program 250. In a trace tree representing a primary trace and one or more secondary traces, the primary trace can be represented by a trace tree trunk beginning with a root and terminating with a trunk leaf, and having no predecessor. Each secondary trace can be represented by a twig beginning with a crown and terminating with an end leaf. A final secondary trace can be represented by a trace tree twig, terminating with a terminal leaf and having no successor. Each twig has a predecessor, and is arranged in a trace tree in a forward succession sequence, in accordance with an observed order of occurrence. Typically, each end leaf, including the terminal leaf, corresponds to the trunk leaf, with all leafs referring back to the trace tree root.

VMM 210 may invoke (S345) TC 220, and provide TC 220 with the trace tree data structure to generate (S350) a compiled code segment of corresponding native machine code for target platform 275. Advantageously, native code generation by TC 220 proceeds in a last-first sequence, bottom-up order, beginning with the terminal leaf and ending with the root. A reverse-sequence, reverse-order compilation technique can simplify code generation. Generating (S350) may include performing on-the-fly optimizations such as register allocation, dead code elimination, and common subexpression elimination. Dead code may be "eliminated" by marking corresponding code as dead, to preempt native code from being generated for it. It may be advantageous to mark, and not remove, dead code, because such code may be used in a subsequently-discovered trace, and no longer be "dead." After compilation, a compiled code segment may be stored (S355) the CCS in code cache 280. If application program 250 has not yet completed, VMM 210 may resume execution (S305).

Compiled code segment execution (S310) may be terminated by a bailout condition, and VMM 210 can be configured to identify, track, and respond (S365) to a predetermined bailout condition prior to invoking (S315) VCI 240 to resume application program 250 execution. One example predetermined bailout condition can be a side exit to a secondary cycle path, which may occur in a primary cycle path at a conditional branching node, referencing an untaken conditional branch path. Typically, a secondary cycle path can begin at the side exit and terminate at secondary exit point, which refers back to the primary entry point, or anchor node, of the primary cycle. In a frequently-executed cycle, compiled code termination through a side exit to a secondary cycle path may be expected to occur with a high frequency, and it may be beneficial to record instructions corresponding to the secondary cycle path as a secondary trace. It may be desirable to monitor conditions causing bailouts, and record a secondary trace after the occurrence of a predetermined number of bailouts, for example, three bailouts for a selected bailout condition.

In accordance with method 300, TC 220 may produce a compiled code segment capable of transferring control and program state information for application program 250 back to VCI 240 at the point of compiled code termination upon the occurrence (S360) of a bailout condition. For example, TC 220 may include program environment information, such as stack and local variable information, corresponding to selected side exits, so that VCI 240 may use the program environment information to resume application program 250 execution at the programmatic location of the respective side exit, once invoked by VMM 210. Beneficially, VMM 210 may record a secondary trace without resorting to execution threshold criteria, in response to preselected bailout conditions. Thus, method 300 can be a dynamic, incremental compilation method, in which additional compiled code may be generated for subsequently discovered instruction sequences, corresponding to previously compiled portions of the application program 250.

In addition, VMM 210 can commence recording instructions corresponding to a secondary trace, as VCI 240 executes the corresponding instruction code sequence. Beneficially, method 300 does not require that any existing secondary cycle path be compiled along with the primary cycle path with which they may correspond. Instead, secondary cycle paths can be discovered in a succession of actual occurrence during execution of application program 250, and can be transformed, also in succession, into a secondary twig to be added to the trace tree corresponding to previously compiled code segment. Moreover, it may be desirable to extend a trace tree representation by merging each successive secondary trace tree twig and by recompiling the entire trace tree representation, as extended. As a result, method 300 can be responsive to the environment in which application program 250 is executing, and may adapt to a cycle topology that may change over time in concert with the evolving program environment.

Figure 4:
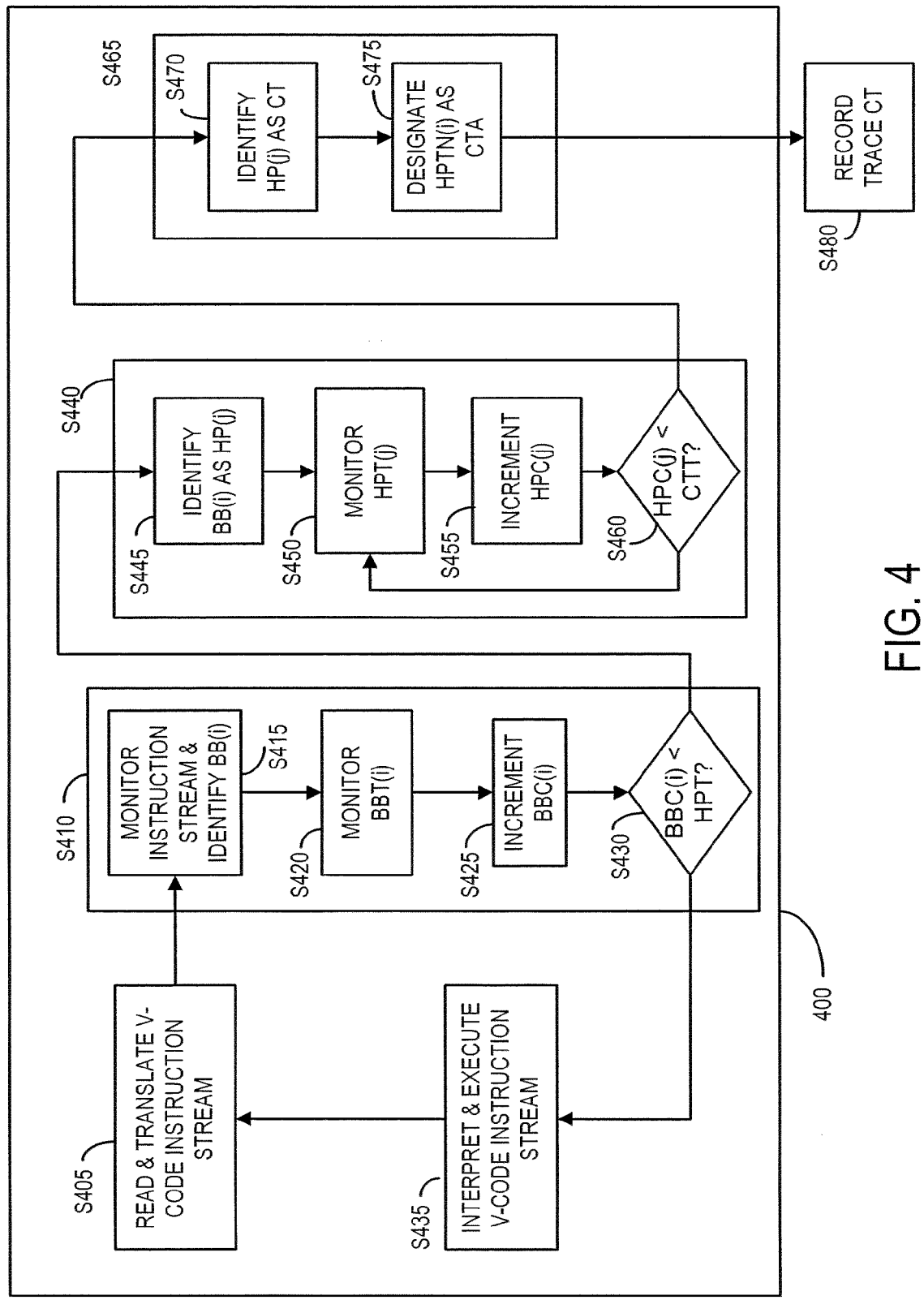
FIG. 4 is a flow diagram generally depicting a present trace selection method.

Turning now to FIG. 4, an embodiment of trace selecting method 400 can be described. Method 400 may be carried out by VMM 210, for example, in a manner functionally similar to actions S320 and S325, described with respect to FIG. 3. In general, instruction sequences follow a forward flow of control, and each cycle sequence typically includes at least one backward branch. A cycle typically exhibits a primary cycle entry point (BBTN), a primary cycle path, and a primary cycle exit point (BBCN), although other latent exit points, namely side exists, may exist. In the context of FIGS. 1A-1B, BBTN 120 is a destination of BBCN 150 when is executed, thus, BBTN 120 may be identified as a target loop header. The existence of a cycle may be implied when a BBCN instruction is executed and refers to a corresponding target loop header (BBTN).

Trace selecting method 400 can be used by VMM 210 to monitor (S405) execution of application program 250 v-code instructions by VCI 240, to identify potential BBCN, potential BBTN, or both. Once identified, VMM 210 may monitor BBCN execution frequency, BBTN execution frequency, or both. If, for example, VMM 210 determines that a monitored BBTN is executed with at least a predetermined cycle threshold frequency, then VMM 210 then may identify a selected trace that may extend inclusively from the monitored BBTN header to the corresponding BBCN instruction targeting the BBTN. As used herein, an anchor node describes a target loop header (BBTN) corresponding to a trace and a terminal node describes the corresponding backbranching instruction (BBCN). Typically, an anchor node has no predecessor node, and a terminal node has no successor node.

It may be desirable to implement to employ a hierarchical trace selection technique using hierarchical selection criteria, because application program 250 may take a circuitous path during execution by VCI 240, and because related cycles may exist, that is, may have at least partially overlapping instruction paths. A non-limiting example of a hierarchical trace selection technique using hierarchical selection criteria is depicted in FIG. 4, in which a cycle, executed with at least a predetermined hotpath threshold frequency, can be selected (S410) as a hotpath, with a selected hotpath executed with at least a predetermined trace threshold frequency, being selected (S440) as a trace.

With regard to selecting (S410) a hotpath, it is desirable to identify and monitor candidate cycles, because not every branching operation that may occur in an instruction stream corresponds to a cycle. In addition, it is possible that multiple cycles may exist during a program execution. To assist in identifying frequently-executed cycles, a hash table may be used, for example, with a counter, BB(x) being assigned for each cycle. Typically, the ith cycle, BB(i) may be identified (S415) in a frequently-used path by observing that a particular backbranch control node, BBCN(i) creates a backbranch path by transferring execution control back to a particular target node, BBTN(i). Once identified, BB (i) may be monitored (S420) with execution frequency counter BBC (i) being incremented (S425) upon each access to BBTN (i) via a backbranch path from BBCN (i).

After incrementing, BBC (i) may be evaluated (S430) with respect to a predetermined hotpath frequency threshold, HPT. A cycle that occurs with a frequency less than HPT may continue to be monitored, with the corresponding instruction stream being translated and executed (S435) by VCI 240. However, if the value of BBC(i) is equal to, or greater than, the value of HPT (S430), then the ith cycle, BB(i), may be designated (S445) as the jth hotpath, HP(j), that is, BB(i)→HP(j). Similarly, BBCN (i) and BBTN (i) may be identified as corresponding to the jth hotpath, that is BBCN (i)→HPCN (j), and BBTN (i)→HPTN (j). Target node HPTN (j) then may be monitored (S450) for backbranch access by HPCN (j), with corresponding execution frequency counter HPC (j) being incremented (S455) for each such backbranch access. After incrementing, HPC (j) may be evaluated (S460) with respect to a predetermined trace frequency threshold, CTT. If a frequency of occurrence of the jth cycle, as indicated by HPC(j), does not exceed a predetermined trace threshold value, CTT, (S460), then HP(j) may continue to be monitored (S450). However, if the value of HPC (j) is equal to, or greater than, the value of CTT, the jth hotpath may be designated (S465) as a selected trace, that is, HP (j)→CT. In addition, HPTN (j) can be designated (S470) as the anchor node for trace CT, CTA, with HPCN (j) implicitly corresponding to the terminal node for trace CT. Conveniently, embodiments in accordance with the present disclosure may track loop headers BBTN (i) and HPTN (j), without tracking corresponding BBCN (i) or HPCN (j). After selection, VM 210 may record (S475) trace CT.

Figure 5:
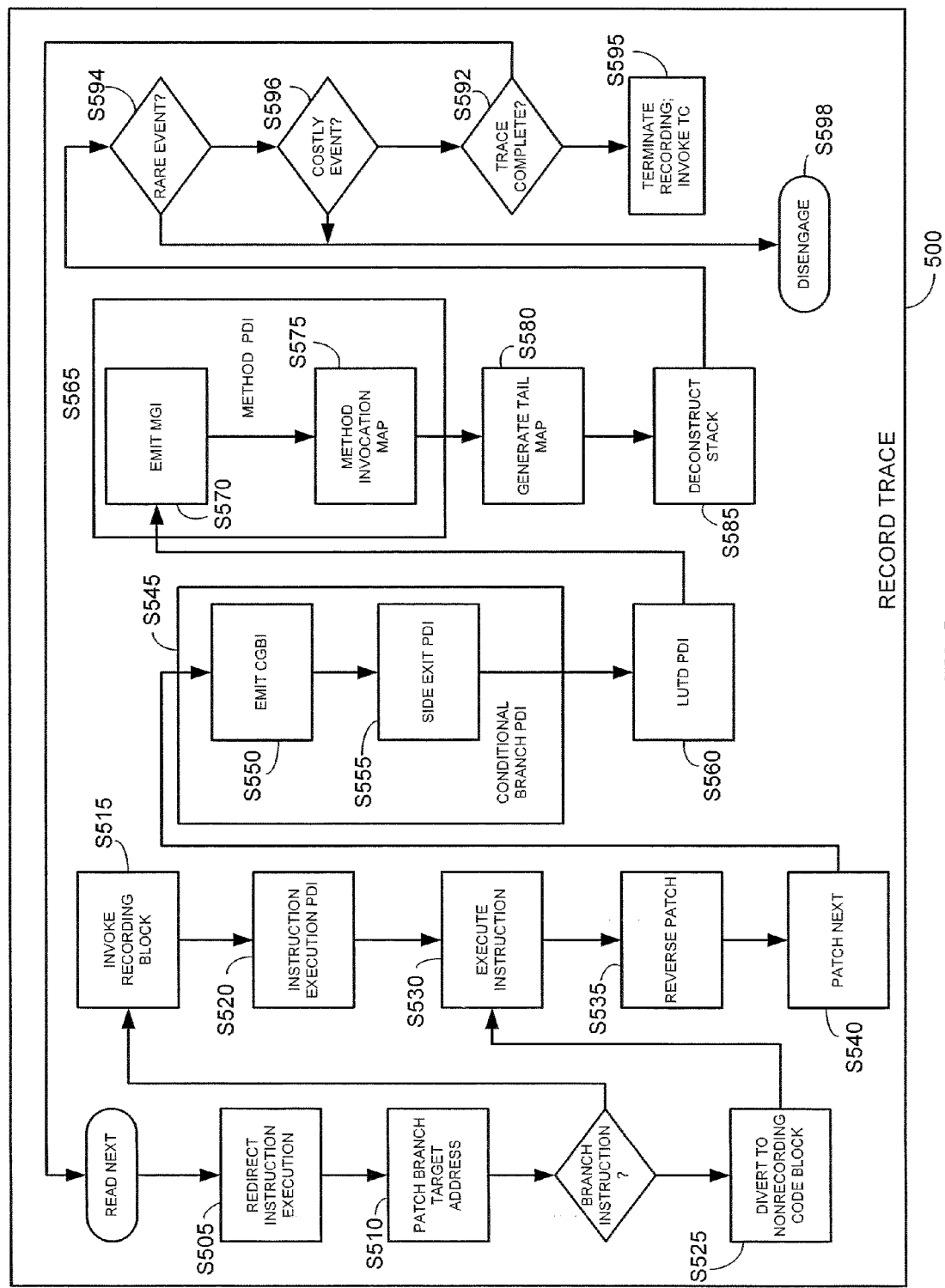
FIG. 5 is flow diagram generally depicting a method for recording a trace, in accordance with the present disclosure.

FIG. 5 illustrates an example method 500 for recording a selected trace, such as trace CT identified in action S465 of FIG. 4. Desirably, the trace can be recorded using a v-code in which program description information can be embedded, and the address of trace anchor node CTA in the trace code instruction path can be embedded therein as label. Method 500 can be used to record a primary trace corresponding to a selected cycle, as well as to subsequently record one or more secondary traces corresponding to the selected cycle. In selected trace recording method embodiments, VCI 240 may execute an instruction and may notify VMM 210 of the executed instruction, with VMM 210 records the instruction information provided by VCI 240. Such method embodiments might not be desirable because an existing virtual code interpreter may need to be modified to provide a notification operation to VMM 210.

In other selected trace recording method embodiments, VMM 210 may employ a redirection recording technique to intercept, analyze, and record an instruction before, or perhaps, concurrently with, instruction execution by VCI 240. A redirection recording technique may be advantageous, for example, where it is desirable to reduce or eliminate certain overhead associated with other trace recording methods, including those corresponding to post-execution notification. In certain redirection techniques, an instruction may be directed to a recording block in advance of execution by VCI 240, so that VCI 240 need not be modified.

Accordingly, trace recording method 500 may begin by redirecting instruction execution (S505) in preparation for recording. A selected instruction may be redirected, in a non-limiting example, by temporarily modifying an address corresponding to the selected instruction to point to a recording block, by recording the redirected instruction in the recording block, by restoring and directing the instruction to VCI 240 for execution, and by temporarily modifying the next instruction to be executed to facilitate subsequent redirection. Desirably, initial redirection may begin with the first trace instruction following the anchor node. In certain embodiments, temporarily modifying an address may include patching (S510) the branch target address of the next instruction to be recorded, to correspond to a preselected recording block address.

Invoking (S515) the recording block can record the patched instruction in the preselected recording block. The recorded instruction may be analyzed to generate (S520) program description information corresponding to instruction execution, and directed to VCI 240 to be executed (S530). Advantageously, recording instructions actually executed by VCI 240 can simplify the trace recording because only the executed portion of an instruction sequence of a method, a loop, or a branching node, is recorded in the trace as a linear sequence. For example, when execution threads through a portion of a method, it may not be necessary to generate method stack information used to manage the entirety of the method—for only a linear portion of the method is executed.

Program description information generated (S520) with respect to instruction execution may be embedded in the recorded trace code and may include, without limitation, a current value of the CPU program counter, an opcode corresponding to the executed instruction, and a top-of-stack value, which may correspond to an instance of a trace structure. It may be advantageous to not record execution of a selected branch instruction, so that method 500 also may include diverting (S525) the selected branch instruction to a non-recording code block, prior to executing (S530). Following execution of the selected instruction by VCI 240, method 500 may use preselected recording block information to reverse (S535) the patching (S510) of the instruction invoking the preselected recording block, as well as to effect patching (S540) of a subsequent instruction label.

It is desirable to generate additional trace program description information, which may be useful to analyze and optimize trace code, as well as to facilitate correct execution of native code compiled from the recorded trace. Accordingly, trace recording method 500 also can include generating (S545) conditional branch program description information, including creating (S550) a conditional branch guard instruction (CBGI) for an exit point of a selected conditional branching node in the trace. Each conditional node exit point generally corresponds to a conditional decision point and, thus, a conditional branch path. During execution of trace code, execution of a conditional branching instruction may direct program flow to a primary exit corresponding to an active conditional branch path, that is, a branch path taken during execution, or to a side exit corresponding to a latent, or untaken, conditional branch path.

A CBGI can facilitate correct program flow at the respective decision point during execution to check for a respective branch condition, or its complement. For example, where a conditional branching instruction follows a taken branch for a condition value equal to zero, a corresponding CBGI can be a "guard if not equal zero" (GNE) instruction, in which a compiled trace may be aborted through a side exit, if the conditional value does not equal zero at the time the compiled trace is executed. Conditional branch conditional branch program description information also may include generating (S555) side exit information that may be preserved in compiled code for use by VCI 240 to resume execution of application program 250 after a bailout evoked by a side exit termination. Advantageously, a CBGI may be used to identify a joint point for a subsequently discovered secondary trace for the respective conditional branching instruction.

Method 500 also may generate (S560) lookup table dispatch (LUTD) program description information, in which a guard instruction also may be generated for a LUTD instruction, including, a corresponding address/value pair. LUT dispatching can be used at an intermediate code level, for example, to implement a high-level language construct, such as a switch/case construct. Conveniently, a LUTD instruction may be viewed as a form of a conditional branch instruction, in which the respective condition value may be compared to a corresponding LUT value. Accordingly, a CBGI may be configured to facilitate correct program flow at a respective dispatch point, or to abort a compiled trace through a side exit, if the actual condition value encountered during execution does not correspond to the condition value expected by the CBGI. LUTD profiling information, including corresponding CBGI, can be embedded in the recorded trace code.

In addition, it can be advantageous to generate (S565) method program description information, including generating (S570) a method guard instruction (MGI) corresponding to invocation of a selected method executed during trace recording. In accordance with the present disclosure, method inlining may simplify method management substantially by recording as a linear instruction sequence only the executed portion of the respective method. As such, an activation record corresponding to an inlined method may not be created, as may be necessary with an existing procedure call or a method invocation.

A static method dispatch type calls one target method at run time, can be inlined directly during trace recording. However, the target method invoked by virtual method and interface method dispatch types may be selected by the actual receiver object type present at runtime, ordinarily requiring method invocations may be processed differentially, depending on the method dispatch type. Because the instructions recorded can correspond to the actual method executed at runtime, method inlining also may facilitate dynamic compilation and optimization of selected method operations, including multimethod dispatch and dynamic typing, Moreover, a stack frame or activation record may not be required for an invoked method call at each iteration. Instead, additional local variables can be allocated into machine registers, as local variables in the outermost scope of the corresponding trace tree. When a side exit occurs within inlined method code, additional method frames on the stack may be generated from embedded method program description information, or an activation record may be generated before writing back the corresponding stack and local variable state. It may be desirable to generate (S570) an MGI that is configured to check whether a target method is valid at runtime, for example, by comparing the actual object type for which the method may be invoked with the recorded object type encountered during trace recording.

During later execution of corresponding native code to the portion of a respective method embedded in the recorded trace code, code execution may be permitted to proceed, if the actual method type matches the recorded type; otherwise, the corresponding MGI may trigger a bailout condition. Thus, creating (S575) a method invocation map may be desirable, for example, between machine code registers and corresponding method stack and local variables. A method invocation map may preserve method stack and state information, which may be used during an MGI-related bailout to facilitate program flow control from the aborted compiled code segment to v-code instructions executed by VCI 240. Also, invoked method program description information may be used to generate side exit stubs that write back selected method invocation map information into the corresponding local variable locations upon a side exit bailout from within the respective method.

Other method program description information may be generated to circumscribe the potential scope of a respective method call. Although simple methods can be inlined readily, particularly when the respective method includes no, or very few, conditional branches, a complex method may include numerous backbranches. A predetermined boundary value may be employed to limit a corresponding inline trace length. It also may be desirable to limit the scope of method calls to be inlined. For example, it may be advantageous to limiting a method scope to a downcall, in which the corresponding anchor node can be located in the same or a surrounding scope as all leaf nodes, including the terminal leaf. Accordingly, a downcall limit may be used to restrict RETURN statements, and also may be used to abort a trace that may encounter a RETURN statement in scope ( ). A downcall limit may simplify handling and profiling of inlined method side exits, because a side exit node may be annotated with an ordered list of scopes that may need to be rebuilt, if the native code trace execution encounters a bailout condition at the respective side exit. As with other program description information, method program description information may be embedded into the recorded trace code.

In view of the foregoing, it will be understood that selected present embodiments may facilitate optimization, dynamic compilation, or both, of a loop, a procedure, or a method, including a dynamically dispatched method.

Upon completing execution of a trace, but before returning control to the corresponding anchor node a loop state map (tail map) may be generated (S580) as trace program description information, including without limitation, machine state, stack, and local variables which may have been altered during an iteration of a traced loop. During a side exit, a loop state map may be used to write back altered values, for example, because one or more values may be pending from a previous loop iteration. A loop state map may be embedded as program description information in the recorded trace code, as well.

Advantageously, stack deconstruction (S585) as described herein can facilitate loop invariant analysis and transformation of local variables into TTSSA form. Stack deconstruction (S585) can be implemented by constructing an indexed renaming table, in which an index number can be assigned to an operand reference, where an operand reference can be associated with each stack location and corresponding set of local variables. In general, an operand refers to a defining instruction in the recorded trace, instead of the actual reference stack locations or local variables. The renaming table may be used to record each instruction and to map local variables, and to update all operand references, on the fly, using a single forward scan. At the end of a loop, a renaming table and tail map may be used to identify loop invariant variables. A corresponding name in trace tree static single assignment (TTSSA) form may be assigned to each renaming table entry, so that the renaming table may be used to reference each of the local variable by their respective TTSSA names, instead of the local variable index. Because the renaming table may be updated readily, a new corresponding TTSSA name may be assigned on the fly to an entry, for example, when a new value is written into a respective local variable. Also, each mapping in the tail map may include a location where a value is defined and a corresponding local variable index to which the local variable is to be written back.

Trace recording may be halted (S592) when a trace recording completes by returning control to the corresponding target node, after which TC 220 may be invoked (S595). Trace recording may abort before trace recording completes, for example, in response to an exceptional event occurrence (S594), or to a costly event occurrence (S596). One non-limiting example of exceptional event includes a thrown exception, and another includes invocation of a native method. It may be desirable to abort and disconnect trace recording upon occurrence of an exceptional event, because it is not desirable to compile infrequently-executed instruction segments. One non-limiting example of a costly event occurrence may include a memory allocation instruction, and another example may be a cycle having an excessive length. A memory allocation instruction may consume hundreds of CPU clock cycles to execute, and may compromise a performance increase otherwise realized. An excessively long cycle may represent a significant portion of the corresponding to an application program, such as application program 250 in FIG. 2.

Accordingly, it may be desirable to provide at least one bounding threshold value, by which an excessively long cycle may be identified. For example, a bounding threshold value corresponding to a nested loop depth of three loops, may be beneficial, although a value corresponding to a greater or lesser number of nested loops may be selected. As another example, a bounding threshold value also may be selected to limit the number of backbranches taken. An excessively long cycle may produce a massive trace, which could exhaust limited resources, such as memory, of constrained-resource platform. It may be desirable to abort and disconnect trace recording upon occurrence of a costly event, because it is desirable to produce significant performance increases for a constrained-resource platform, without significantly drawing down platform resources in pursuit of such increases. In selected embodiments, the foregoing method 500 may be extended to provide recording of a secondary trace, which may correspond to a selected side exit from a primary trace. A secondary trace also may be subject to bounding threshold values, and limitations due to an exceptional event occurrence (S594), or to a costly event occurrence (S596), in a manner similar to a primary trace.

Figure 6:
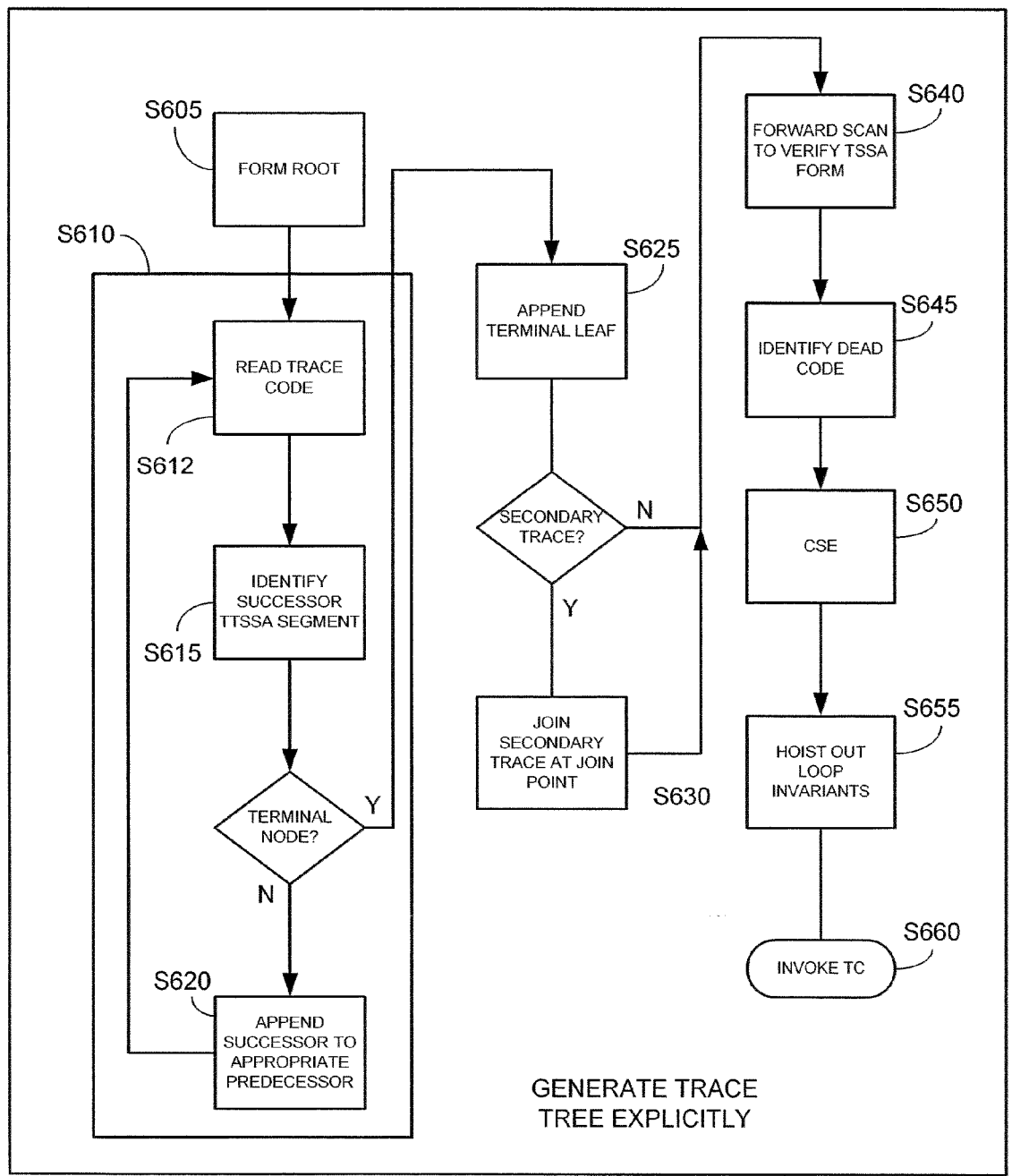
FIG. 6 is a flow diagram generally illustrating a method for generating a trace tree, in accordance with the present disclosure.

Turning to FIG. 6, a trace tree generation method 600 may be described for application to one or more recorded traces. Method 600 may be performed, for example, by VMM 210, by TC 220, or by a cooperative combination thereof. Reference also is made with respect to FIG. 7, in which data structures 701-704 correspond to FIGS. 1A-1B. In general, data structures 701-702 correspond to trace control flows and data structures 703-704 correspond to trace tree structures in TTSSA form.

Data structure 701 illustrates a primary trace, identified in FIGS. 1A-1B between node Q 120, node R 130, node T 150, and backbranch 145 from node T 150 to node Q 120. Where data structure 701 represents a primary trace, node Q 120 can represent an anchor node. Variable dependencies in a primary trace, such as between node R 130 and node Q 120, if any, may be resolved rather easily. Data structure 702 illustrates an S-T secondary trace, discovered subsequently to the Q-R-T primary trace, and joined at common root Q node 120. The secondary trace is formed between node Q 120, node S 140, node T 150, and backbranch 145 from node T 150 to node Q.

Data structure 702 also may represent an older, predecessor Q-R-T secondary trace to which is joined a younger, successor S-T secondary trace. Where data structure 702 represents a succession of secondary traces, node Q 120 can represent a guard node, for example, a CBGI, corresponding to a conditional IF statement. Variable dependencies between successor S-T trace and node Q 120 can be substantially the same as those between node Q 120 and the R-T segment of the predecessor Q-R-T trace. By resolving dependencies between successor S-T secondary trace, and node Q, similar dependencies between the R-T segment of the predecessor Q-R-T trace and node Q 120. In general, the foregoing advantages of reverse succession sequence code analysis and code generation may be extended over a succession of secondary traces ordered from oldest to the most recently discovered, and traversed from youngest to oldest, completing with the primary trace.

Data structure 703 generally corresponds to a trace tree structure formed, for example, from primary trace recording 701, along with corresponding trace program description information embedded therewith. Node Q 120 has no predecessor node and, thus, can be a root. Node T has no successor node and, thus, can be a terminal leaf. By ordering Data structure 704 generally corresponds to a trace tree structure formed, for example, from a primary trace recording, such as illustrated in data structure 703, with an addition of a selected secondary trace, as depicted in data structure 702.

Figure 7:
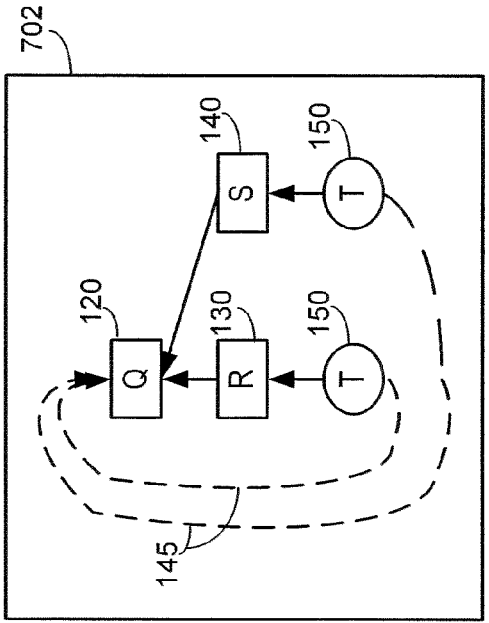
FIG. 7 illustrates trace data structures and trace SSA data structures, generally corresponding to FIGS. 1A and 1B.
Figure 7:
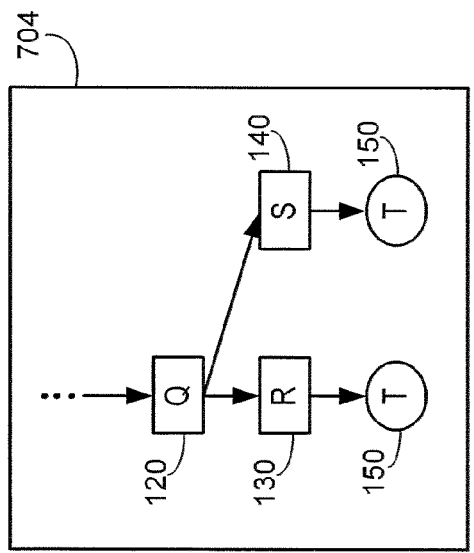
Figure 7:
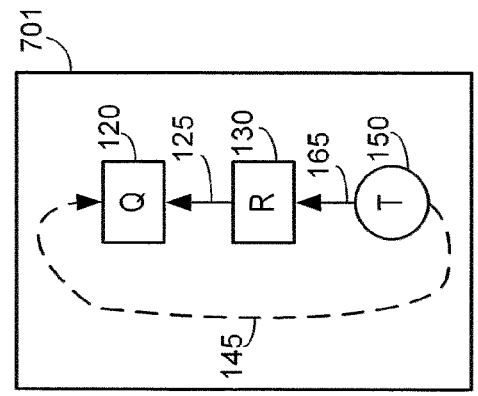
Figure 7:
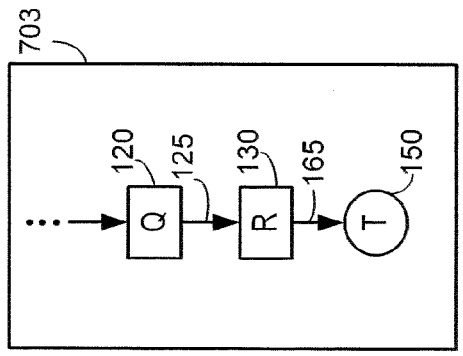

Data structure 704 illustrates replication of the execution path of primary trunk Q-R-T, and of the secondary twig S-T. In FIGS. 1A, 1B, and 7, node Q 120 may be designated as an anchor node. Also, a forward temporal order implicitly exists in the corresponding executed instructions, from node Q 120 at top, to node T 150 at bottom. The illustrated forward succession sequence proceeds from left-to-right, in which primary trunk Q-R-T is a predecessor to successor secondary twig S-T.

Typically, transforming traditional traces into traditional static single assignment form can be made difficult by a potentially large number of control flow junctures, such as that represented by node T in FIGS. 1A-1B, because a variable that occurs in each branch needs to be represented by a separate operand in a corresponding Φ function, in order to facilitate later reconciliation of the variable. Also, as is known in the art, transforming a traditional control flow graph into a traditional SSA form may require managing complex trace properties to place Φ nodes, including, for example, performing a dominant tree analysis and determining dominance frontiers.

In general, an Φ function tends to propagate to successively executed nodes, and the proliferation of Φ functions and corresponding operands over successive dominance frontiers, as may be found in loops, methods, and conditional branches may be costly to generate, manage, and reconcile. Thus, although rendering traces in standard SSA form may afford a desirable degree of optimization, it is a tool directed to manage complex control flows whose benefits come at a cost too great for most constrained-resource platforms.

Recorded trace code, such as illustrated in data structures 701 and 702, replicates methods, operations, and loops, dynamically discovered in the recorded trace body, by re-tracing and duplicating each identified execution path, with each path being in the form of a linear instruction sequence. In general, a TTSSA form is similar to traditional SSA form, but adapted to accommodate linear instruction sequence traces, including a primary trace, a secondary trace, or both. Because each trace can be represented by a linear sequence, with the primary and secondary traces constituting a trace tree having the same join point—the primary trace root, transforming recorded trace code into a TTSSA form can be simplified. For example, in a primary trace, every trace instruction within the cycle can have one predecessor instruction. It may be convenient to insert an Φ node for the primary trace at the trunk leaf.

Similarly, in a secondary trace, every trace instruction subsequent to the corresponding guard node also has one predecessor instruction. As a result, every trace may include a corresponding Φ node for at the respective end leaf of the trace. Advantageously, a trace tree model in accordance with the present disclosure is constituted of linear trace segments, in which each segment terminates with a leaf node referring back to a common root, with each trace having an Φ node inserted at the trace leaf node termination. Embodiments of the disclosed trace tree model may simplify significantly transforming a primary trace into a primary trunk in TTSSA form, and transforming a succession of secondary traces into respective secondary twigs in TTSSA form. In accordance with the embodiments disclosed herein, transforming a trace code corresponding to a trace tree into TTSSA form can facilitate loop invariant code hoisting, by permitting hoisting to be performed in substantially linear time, and substantially without Φ instruction dependencies, which may traditionally complicate code hoisting. Advantageously, transforming trace code into TTSSA format does not require the extensive analysis mentioned described with respect to traditional control flow graphs and traditional SSA form, because reconciliation of two different incoming control flows, loop start and back-edge, is performed only with respect to the anchor node.

In trace recording method 500, instructions and program description information of trace recording 701 were transformed into TTSSA form, on-the-fly, producing an ordered sequence of TTSSA segments, such that the resulting trace tree structures 703, 704 are rendered generally in TTSSA form. Method 600 can include forming (S605) a root of a primary trunk, and extending (S610) the primary trunk from the root to the terminal trunk leaf by reading a corresponding portion of recorded trace code (S612), identifying (S615) a successor TTSSA code segment, and appending (S620) a successor TTSSA segment to a predecessor TTSSA code segment. A successor segment may represent a portion of an execution path of application program 250 that occurred subsequently to a predecessor segment, with an instruction sequence having a forward temporal order progressing from the top, at the root, to the bottom, at the corresponding terminal leaf. Thus, the lowest TTSSA segment on a trace tree generally corresponds to trace code recorded closest in time to trace termination. Trace tree formation may terminate (S625) when the terminal node of the trace code is added to the trace tree as a terminal leaf of the trace tree in a terminal trace SSA segment.

Furthermore, trace tree generation method 600 may include extending a trace tree by joining (S630) at a predetermined join point, a secondary, or successor, trace to a primary, or predecessor, trace. It may be beneficial to transform each of the predecessor trace and the successor trace into TTSSA form prior to joining. Typically, the predetermined join point corresponds to a guard node, as may represent a CBGI inserted into the predecessor during trace recording. Each successor trace may be so joined to a corresponding predecessor guard node, in a succession sequence generally corresponding to the order in which each successor trace is discovered.

Although a successor secondary trace may be compiled and added to the existing native code of a previously-compiled trace tree, it can be desirable to re-compile the entire trace tree. Recompilation can permit resolution of dependencies which may exist between variables in related successor traces at various levels of the trace tree. Method 600 also may include forward scanning (S640) to place the trace tree in TTSSA form. Forward scanning may be desirable to confirm that substantially all of the traces have been rendered into TTSSA form and optimized. Responsive to scanning, method 600 may include identifying (S645) a dead code segment. Although a common subexpression (CSE) may be eliminated (S650) when discovered during a forward scan, it may be beneficial to defer dead code segment marking until code generation begins, to reduce erroneous or premature elimination. Method 600 also may continue by identifying and hoisting out (S655) loop invariant variables and code. One or more of actions S645, S650, and S655 may not be performed during method 600 and, instead, may be performed during trace code recording, such as by method 500, or during native code generation, such as by method 800, which follows.

However, it must be understood that when a primary trace and successive secondary traces are transformed into TTSSA form, and arranged into a predetermined forward succession sequence, as may occur during trace recording, such as method 500 in FIG. 5, it may not be necessary to invoke explicit trace tree generation method embodiments, such as method 600, or to generate an explicit trace tree data structure according to a trace tree model. Indeed, the traces in TTSSA form arranged in a predetermined forward succession sequence realize an implicit trace tree structure, which may be exploited beneficially during native code generation.

Figure 8:
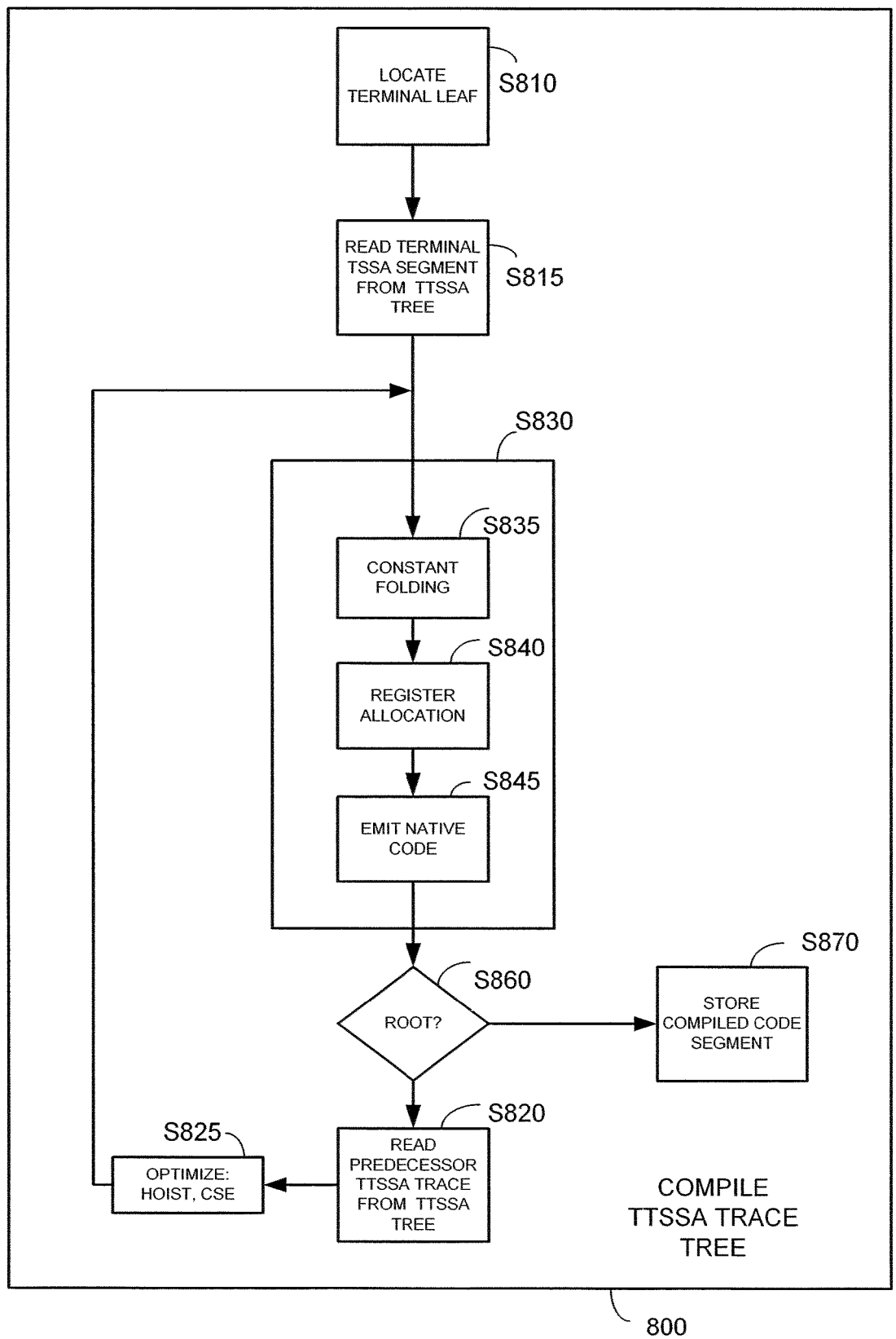
FIG. 8 illustrates a method for compiling native code in a reverse order, in accordance with the present disclosure.

FIG. 8 illustrates code generation method 800, which may be used to translate recorded trace code representing a trace tree in TTSSA form (that is, a TTSSA trace tree. The TTSSA trace tree implicitly incorporates, in general, a forward temporal order for executed instructions and, in particular, a predetermined forward succession sequence for successively discovered traces. The bottom-up, reverse sequence compiling technique traverses the trace tree in reverse of the forward temporal order in the recorded trace, that is, from the terminal leaf (bottom) to the root (top). It is desirable to perform code generation scanning in a single pass.

Method 800 can begin by locating (S810) and reading (S815) the terminal leaf corresponding to a terminal successor twig in a trace tree structure. As described previously, the terminal leaf of a terminal successor twig typically represents the last trace code recorded. It can be advantageous to perform native code generation by scanning recorded trace code representing a trace tree in TTSSA form in a predetermined reverse succession sequence. The predetermined reverse succession sequence is generally ordered in reverse of the predetermined forward succession sequence, that is, scanning may proceed from a successor twig to a predecessor twig. In addition, it is desirable to scan a successor twig from end leaf through the corresponding successor twig crown, proceeding to the immediate predecessor twig end leaf through the corresponding immediate predecessor twig crown, and so on through each successive predecessor, until the primary trunk is reached and scanned from trunk leaf to root. During reverse succession scanning (S820), it may be possible to perform (S825) selected code optimizations, such as eliminating common subexpressions. Additional loop invariance optimizations also may be performed in action S825. Also, during code generation (S830), it may be desirable include emitting constant folding (S835), register allocation (S840), or both, in-lock with emitting (S845) native code. Emitting (S860) trace tree root code can complete compilation. Reverse traversal can be advantageous, for example, during register allocation by identifying all uses of code and variables before registers are allocated. After compilation, the compiled code segment corresponding to the traced code may be stored (S870), for example, in code cache 265 in FIG. 2.

Although the embodiments disclosed herein may be described in terms of translating a virtual machine code into a native machine code, present embodiments may apply equally to translating from a first computer code corresponding to a first computer architecture to a second computer code corresponding to a second computer architecture.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A target platform including a CPU comprising:
    a virtual machine monitor configured to monitor execution frequency on the CPU of an anchor node targeted by a back branching control node and to record next executed virtual machine code instructions corresponding to a linear instruction sequence of a selected cycle when execution of the anchor node exceeds a predetermined frequency, the linear instruction sequence traversing a portion of a loop from the anchor node to the back branching control node targeting the anchor node, the loop including a method call and at least one conditional branching instruction between the anchor node and the back branching control node targeting the anchor node, and the linear instruction sequence including only an executed portion of a method invoked using the method call;

a compiler, cooperating with the virtual machine monitor, configured to compile the virtual machine code instructions for the next executed virtual machine code instructions corresponding to the linear instruction sequence of the selected cycle into a compiled code segment of native machine code executable on the target platform, and without compiling unexecuted portions of the method invoked using the method call; and wherein the virtual machine monitor is further configured to cause execution of the compiled code segment of native machine code on the CPU in lieu of further execution of the virtual machine code corresponding to the linear instruction sequence of the selected cycle.

2. The target platform of claim 1, wherein the loop comprises multiple internal paths.

3. The target platform of claim 1, further comprising a virtual code interpreter configured to execute the virtual machine instructions.

4. The target platform of claim 3, wherein the compiled code segment includes a bailout condition terminating program execution, and wherein the virtual code interpreter is configured to cooperate with the virtual machine monitor to resume program execution of the application program at an application program location corresponding to the bailout condition.

5. A target platform including a CPU comprising:
a virtual machine monitor configured to record executed virtual machine code instructions corresponding to a linear instruction sequence of a selected cycle; and
a compiler, cooperating with the virtual machine monitor, configured to compile the virtual machine code instructions for executed virtual machine code instructions corresponding to the linear instruction sequence of the selected cycle into a compiled code segment of native machine code executable on the target platform,
wherein the virtual machine monitor is further configured to cause execution of the compiled code segment of native machine code on the CPU in lieu of further execution of the virtual machine code corresponding to the linear instruction sequence of the selected cycle, and
wherein the linear instruction sequence traverses a portion of a method or a loop from an anchor node to a back branching control node targeting the anchor node, the method or the loop includes a method call, the compiler compiling only an executed portion of a method invoked using the method call, without compiling unexecuted portions of the method invoked using the method call;
wherein the virtual machine monitor is further configured to record further executed virtual machine code instructions corresponding to a further linear instruction sequence of the selected cycle, the further linear instruction sequence of the selected cycle beginning at a conditional branching instruction in the linear instruction sequence of the selected cycle;
wherein the compiler is further configured to, subsequent to compilation of the virtual machine code instructions for executed virtual machine code instructions corresponding to the linear instruction sequence of the selected cycle into a compiled code segment of native machine code executable on the target platform, compile the virtual machine code instructions for executed virtual machine code instructions corresponding to the linear instruction sequence of the selected cycle and the further executed machine code instructions corresponding to the further linear instruction sequence of the selected cycle into a further compiled code segment of native machine code executable on the target platform, and wherein the virtual machine monitor is further configured to cause execution of the further compiled code segment of native machine code on the CPU in lieu of further execution of the virtual machine code corresponding to the linear instruction sequence and the further linear instruction sequence of the selected cycle.

6. The target platform of claim 5, wherein the virtual machine code instructions for executed machine code corresponding to the linear instruction sequence for the selected cycle comprises a primary trace and the further virtual machine code instructions for further executed machine code corresponding to the further linear instruction sequence for the selected cycle comprises a secondary trace, and the virtual machine code instructions of the primary trace and the secondary trace are ordered in a predetermined forward succession sequence.

7. The target platform of claim 6, wherein the compiler is configured to compile the virtual machine code instructions in reverse of the predetermined forward succession sequence.

8. The target platform of claim 7, wherein the method comprises a dynamically dispatched method, wherein the loop comprises multiple internal paths, or both.

9. The target platform of claim 5, wherein the target platform is a constrained-resource platform, including one of a mobile wireless device, a handheld device, a personal digital assistant, or a personal communication device.

10. A method of executing a program based interpreted instructions, comprising:
interpreting at least portions of instructions of a program into native machine code and executing the native machine code on a processor;
monitoring frequency of execution of an anchor node in the instructions;
if frequency of execution of the anchor node exceeds a predefined limit, recording at least next interpreted and executed instructions, the next interpreted and executed instructions being a linear instruction sequence that is only one of a plurality of paths sharing the anchor node and that includes a method call and only an executed portion of a method invoked using the method call;
compiling the next interpreted and executed instructions corresponding to the linear instruction sequence into a compiled segment of further native machine code, without regard to any others of the plurality of paths sharing the anchor node, and without compiling unexecuted portions of the method invoked using the method call; and
executing on the processor the further native machine code in lieu of interpreting and executing the instructions corresponding to the linear instruction sequence.

11. A method of executing a program based on virtual machine node instructions, comprising:
interpreting at least portions of virtual machine code by forming at least portions of virtual machine code instructions of a program into native machine code by a virtual code interpreter and executing the virtual code interpreter formed native machine code on a processor;
recording virtual machine code instructions corresponding to a linear instruction sequence of a selected cycle of a sequence of the interpreted virtual machine code, the linear instruction sequence of the selected cycle being one of a plurality of paths sharing a common anchor node and including a method call and only an executed portion of a method invoked using the method call;

compiling the virtual machine code instructions corresponding to the linear instruction sequence of the selected cycle into further native machine code, without compiling unexecuted portions of the method invoked using the method call; and executing on the processor the further native machine code in lieu of interpreting the virtual machine code instructions corresponding to the selected cycle; and further comprising, after at least compiling the virtual machine code instructions corresponding to the linear instruction sequence of the selected cycle:

recording virtual machine code instructions corresponding to a further linear instruction sequence of the selected cycle the further linear instruction sequence of the selected cycle beginning at a target of a conditional branching instruction in the linear instruction sequence of the selected cycle;

compiling into a single compiled code segment the virtual machine code instructions corresponding to the linear instruction sequence of the selected cycle and the further linear instruction sequence of the selected cycle into still further native machine code; and executing on the processor the still further native machine code in lieu of interpreting the virtual machine code instructions corresponding to the linear instruction sequence of the selected cycle and the further linear instruction sequence of the selected cycle.

\* \* \* \* \*